(12) United States Patent
Hu et al.

(10) Patent No.: US 9,191,563 B2
(45) Date of Patent: Nov. 17, 2015

(54) ZOOM LENS APPARATUS WITH FOCUS ADJUSTING AND OPTICAL IMAGING DEVICE THEREWITH

(71) Applicant: Boly Media Communications (Shenzhen) Co., Ltd., Shenzhen (CN)

(72) Inventors: Xiaoping Hu, Shenzhen (CN); Xia Shen, Shenzhen (CN); Lihua Chen, Shenzhen (CN)

(73) Assignee: Boly Media Communications (Shenzhen) Co., Ltd., Guangdong, Shenzhen (CN)

( * ) Notice: Subject to any disclaimer, the term of this patent is extended or adjusted under 35 U.S.C. 154(b) by 0 days.

(21) Appl. No.: 14/372,928

(22) PCT Filed: Jan. 16, 2013

(86) PCT No.: PCT/CN2013/070515
§ 371 (c)(1),
(2) Date: Jul. 17, 2014

(87) PCT Pub. No.: WO2013/107342
PCT Pub. Date: Jul. 25, 2013

(65) Prior Publication Data
US 2015/0002702 A1 Jan. 1, 2015

(30) Foreign Application Priority Data
Jan. 17, 2012 (CN) .......................... 2012 1 0013791

(51) Int. Cl.
*H04N 5/225* (2006.01)
*H04N 5/232* (2006.01)
*G02B 13/00* (2006.01)
*G02B 15/16* (2006.01)
(Continued)

(52) U.S. Cl.
CPC ................ *H04N 5/2254* (2013.01); *G02B 7/10* (2013.01); *G02B 7/102* (2013.01); *G02B 13/009* (2013.01);
(Continued)

(58) Field of Classification Search
CPC ........ G02B 7/10; G02B 13/009; G02B 15/16; H02N 2/163; G03B 2205/0061; G03B 2205/0069
See application file for complete search history.

(56) References Cited

U.S. PATENT DOCUMENTS

2002/0195540 A1  12/2002  Higuchi
2008/0247053 A1*  10/2008  Iwasawa ....................... 359/676
2011/0234887 A1   9/2011  Shimohata et al.

FOREIGN PATENT DOCUMENTS

CN  101354467 A  1/2009
CN  101425762 A  5/2009
(Continued)

OTHER PUBLICATIONS

International Search Report and Written Opinion from corresponding International Application No. PCT/CN2013/070515, mailed Apr. 25, 2013.
International Preliminary Report on Patentability from corresponding International Application No. PCT/CN2013/070515, dated Jul. 22, 2014.

*Primary Examiner* — Paul Berardesca
(74) *Attorney, Agent, or Firm* — Alston & Bird LLP

(57) ABSTRACT

A zoom lens apparatus with focus adjusting and an optical imaging device therewith are provided, wherein a combination of screw-driven ultra sonic motor and voice coil motor is adopted to drive different optical lens sets (25,61). For the ultra sonic motor, the screw motion of the rotor (23) is transformed into a simple rectilinear motion by providing a third tube (24) placed in the rotor (23) and radially fixed relative to the stator (22). Thus the zoom lens apparatus with focus adjusting produced with the combination can well maintain the stability of the optical axis, moreover, the combination of different driving methods integrates and makes better use of lens sets of different functions and hence simplifies the overall structure.

14 Claims, 2 Drawing Sheets

(51) Int. Cl.
*G02B 7/10* (2006.01)
*G03B 3/10* (2006.01)
*H02N 2/16* (2006.01)

(52) U.S. Cl.
CPC *G02B 15/16* (2013.01); *G03B 3/10* (2013.01); *H02N 2/163* (2013.01); *H04N 5/23296* (2013.01); *G03B 2205/0046* (2013.01); *G03B 2205/0061* (2013.01); *G03B 2205/0069* (2013.01)

(56) References Cited

FOREIGN PATENT DOCUMENTS

| | | |
|---|---|---|
| CN | 102540392 A | 7/2012 |
| CN | 102590979 A | 7/2012 |
| CN | 202494824 U | 10/2012 |
| WO | WO 2007/118418 A1 | 10/2007 |

* cited by examiner

ZOOM LENS APPARATUS WITH FOCUS ADJUSTING AND OPTICAL IMAGING DEVICE THEREWITH

TECHNICAL FIELD

The present disclosure relates to optics, more particularly, to a zoom lens apparatus with focus adjusting and a corresponding optical imaging device therewith.

PRIOR ART

With the popularization and spreading of digital imaging technology, optical imaging devices have been widely applied in various types of equipments. Among them, a large variety of portable and small optical imaging devices meets extensive demands.

As for miniaturized imaging devices, to obtain the ability to accurately adjust focal length, a screw-driven ultrasonic motor (USM) is proposed to adjust focal length (referring to the PCT application WO2007/118418). One basic structure of the USM consists of an outer tube as a rotor with a plurality of piezoelectric elements attached thereon and an inner tube as a stator for holding an optical lens set, wherein the plurality of piezoelectric elements are excited by electric signals to drive the outer tube to generate a traveling wave, so as to drive the inner tube to rotate through the threads of the outer tube matching with the threads of the inner tube, thus producing a linear displacement of the inner tube relative to the outer tube. However, some issues are caused by the structure when the optical lens set is rotated with the inner tube, such as the deviation of optical axis occurred during the installation is difficult to be corrected.

To solve the aforementioned issues, a method has been proposed (referring to a Chinese patent application No. 200810142713.6, publish No. CN101425762). In this method, a new tube is added and placed in the rotor, wherein with the sliding grooves arranged at both ends of the new tube, the new tube may be radially fixed to the stator; and with the engagement between the threads on the outer surface of the new tube and the threads on the inner surface of the rotor, the screw motion of the rotor then may be transformed into a simple rectilinear motion; and by mounting the optical lens set in the new tube (hence the new tube is called as lens tube) placed in the rotor, the rotation of the optical axis may be avoided. However, an optical imaging device is usually provided with multiple optical lens sets which can be adjusted independently, such as an optical lens set for zooming and an optical lens set for focusing; therefore the optical imaging device which utilizes multiple USMs having the aforesaid structure becomes more complex.

SUMMARY

In accordance with an aspect of the present disclosure, a zoom lens apparatus with focus adjusting comprises: a first tube with threads formed on the inner surface thereof; a second tube with threads formed on both outer and inner surfaces thereof, wherein the second tube is placed in the first tube, the pitch and/or the spiral direction of the threads on the outer surface is different from that of the threads on the inner surface, and the threads on the outer surface are arranged to match with the threads on the inner surface of first tube; a first set of piezoelectric elements attached on the outer surface of the first tube and excited by electric signals to propel the first tube to generate a traveling wave, so as to force the second tube to rotate relative to the first tube; a third tube placed in the second tube, wherein threads are formed on the outer surface of the third tube for matching with the threads on the inner surface of the second tube, the hollow portion of the third tube is arranged to hold a first optical lens set, and the third tube is radially fixed relative to the first tube such that the third tube is moved in a straight line along the rotary axis of the second tube during the rotation of the second tube; and a voice coil motor comprising a stationary portion and a movable portion, wherein one of the stationary portion and the movable portion comprises a magnet and the other one comprises a conductor, the conductor is excited by electric signals for driving the movable portion to move in a straight line relative to the stationary portion, the stationary portion is fixed relative to the first tube such that the motion path of the movable portion is parallel to the rotary axis of the second tube, and the movable portion is arranged to fix a second optical lens set thereon.

In accordance with another aspect of the present disclosure, an optical imaging device comprises an aforesaid zoom lens apparatus with focus adjusting as well as optical lens sets and a photo sensor.

In the specific examples disclosed herein, a combination of screw-driven USM and VCM is adopted to drive different optical lens sets, and for the USM, the screw motion of the rotor is transformed into a simple rectilinear motion by providing a third tube placed in the rotor and radially fixed relative to the stator, thus the zoom lens apparatus with focus adjusting produced with the combination can well maintain the stability of the optical axis, moreover, combining different driving methods integrates and make better use of lens sets of different functions, thus simplifying the overall structure.

Hereinafter is given embodiments of the zoom lens apparatus with focus adjusting and optical imaging device according to the present disclosure with reference to the accompanying drawings.

BRIEF DESCRIPTIONS OF THE DRAWINGS

DETAILED DESCRIPTION

First Embodiment

Figure 1:
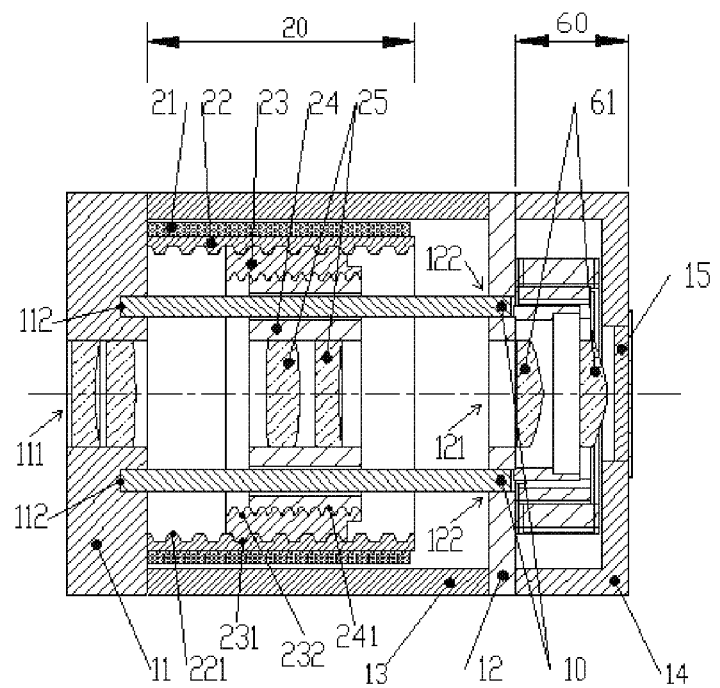
FIG. 1 is a schematic view showing a longitudinal section of the optical imaging device according to an embodiment of the present disclosure.
Figure 2:
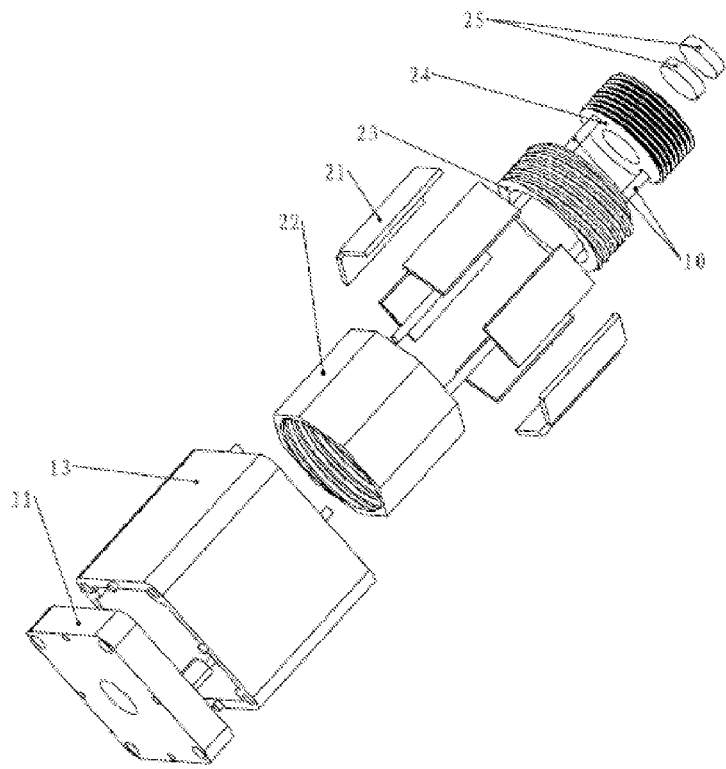
FIG. 2 is an exploded view of part of the structure shown in FIG. 1.

A first embodiment of the zoom lens apparatus with focus adjusting according to the present disclosure comprises two independently controlled zooming and focusing structures, i.e., structure 20 and structure 60 as shown in FIG. 1 and FIG. 2. The structure 20 driven by USM comprises a first tube 22, a second tube 23, a first set of piezoelectric elements 21 and a third tube 24. The structure 60 is driven by voice coil motor (VCM).

The threads 221 are formed on the inner surface of the first tube 22. The second tube 23 with threads 231 on the outer surface thereof and threads 232 on the inner surface thereof is placed in the first tube 22, wherein the thread pitch and/or the spiral direction of the threads on the outer surface is different from that of the threads on the inner surface. The threads 231 on the outer surface are arranged to match with the threads 221 on the inner surface of the first tube 22. The first set of piezoelectric elements 21 attached on the outer surface of the first tube 22 is excited by electric signals to propel the first tube 22 to generate a traveling wave, so as to force the second tube 23 to rotate relative to the first tube 22.

The first tube 22 and the second tube 23 as well as the first set of piezoelectric elements 21 form a screw-driven USM, the exploded view of which is shown in FIG. 2. The first tube 22 may be called as a stator and the second tube 23 as a rotor. The first set of piezoelectric elements 21 may be the set of piezoelectric pieces shown in FIG. 2 (e.g. a set of sheets made of piezoelectric ceramics) and is shaped as a regular polygon and attached on the outer surface of the stator by pasting or welding. Of course, the piezoelectric elements may also be other shapes and forms in other embodiments, as long as the stator can be vibrated to generate circumferential traveling wave. In other embodiments, the surfaces of the threads where the stator matching with the rotor may be treated to be abrasion resistant or coated with an abrasion resistant material; of course, other places referring to screw engagement may be treated in a similar process, which will not be described herein. A detailed description of the screw-driven USM may be referred to the PCT application No. WO2007118418.

The third tube 24 with threads 241 formed on the outer surface thereof is placed in the second tube 23, wherein the threads 241 are arranged to match with the threads 232 on the inner surface of the second tube 23. The third tube 24 is radially fixed relative to the first tube, such that the third tube 24 is moved in a straight line alone the rotary axis of the second tube 23 during the rotation of the second tube 23. The hollow portion of the third tube 24 is arranged to place a first optical lens set 25, hence the third tube is also called as a lens tube.

The VCM comprises a stationary portion and a movable portion, one of which includes a magnet and the other portion includes a conductor. The conductor is excited by electric signals to drive the movable portion to move in a straight line relative to the stationary portion, such that the motion path of the movable portion is parallel with the rotary axis of the second tube 23. The movable portion of the VCM is arranged to fix a second optical lens set 61 thereon.

A variant of the first embodiment of the optical imaging device according to the present disclosure comprises the aforesaid embodiment of the zoom lens apparatus with focus adjusting, accompanied with a first optical lens set 25, a second optical lens set 61 and a photo sensor 15, referring to FIG. 1 and FIG. 2. The first optical lens set 25 having an optical axis parallel to the rotary axis of the rotor of the USM is placed inside the third tube 24. The second optical lens set 61 having an optical axis identical to the optical axis of the first optical lens set 25 is fixed on the movable portion of the VCM. The photo sensor 15 having a photosensitive side perpendicular to the optical axis of the first optical lens set 25 is disposed on the optical path behind the second optical lens set 61. Due to the characteristic of the USM such as small size, long stroke and etc., the first optical lens set 25 may be used for zooming. Owing to the mature processing of the VCM and the feature of small stroke thereof meeting the requirements for application of focus, the second optical lens set 61 may be used for focus.

Referring to FIG. 1 and FIG. 2, in other embodiments of the zoom lens apparatus with focus adjusting, a structure may be further applied to implement the lens tube radially fixed relative to the stator of the USM. Specifically, the structure comprises at least one rod 10 which is radially fixed relative to the first tube 22. At least one through hole parallel to the rotary axis of the second tube 23 is formed within the wall of the third tube 24. The rod 10 passes through the through hole of the third tube 24 such that the third tube 24 may be moved in a straight line along the rod 10 during the rotation of the second tube 23. Of course, the lens tube may also be fixed radially by other ways, such as by the limit structure arranged at both ends of the lens tube. As for the structure, since the lens tube is fixed radially by the rod passing through the wall of the lens tube, the structure can not only be fixed simply, but also be independent with the lens tube; which not only ensures the stability of the optical axis of the optical lens sets installed inside the lens tube, but also make the manufacture and assembly of related components easier, thus achieving precision requirements.

Since the rod 10 is used for fixing the lens tube, to make the lens tube immovable, at least one rod is needed. Considering a better force balance and the stability and accuracy of the structure, two rods are symmetrically disposed (as shown in FIG. 1 and FIG. 2) or multiple rods are uniformly distributed with respect to the rotary axis of the rotor. Of course, a same number of through holes are needed to be formed at corresponding positions on the wall of the lens tube.

Referring to FIG. 1 and FIG. 2, in other embodiments of the zoom lens apparatus with focus adjusting, a structure may be applied to implement the lens tube radially fixed relative to the stator of the USM. Specifically, the structure comprises a first base 11 having a hole 111 and a second base 12 having a hole 121, wherein the first base 11 and the second base 12 are respectively provided with limit holes 112 and 122, the first tube 22 is fixed on the first base 11, and both ends of the rod 10 are respectively inserted or passed through the limit holes on the first base 11 and the second base 12. Correspondingly, the structure of the stationary portion of VCM fixed relative to the first tube 22 is as follow: the stationary portion of VCM is fixed on a third base 14 which is fixedly connected to the second base 12 and used for holding the photo sensor 15. As the rod 10 fixed relative to the first tube 22 is based on the first base 11, the accuracy of design may be more easily to be ensured during the manufacture of components and the assembly may be more simple and reliable. Of course, in other embodiments, the rod 10 may also be implemented in other ways and forms to be radially fixed relatively to the first tube 22; for example, bending an end of the rod 10 and inserting or welding the bended end on the wall of the first tube 22.

Referring to FIG. 1 and FIG. 2, in other embodiments of the zoom lens apparatus with focus adjusting, to ensure a better accuracy of assembly, a seventh tube 13 is provided. The first tube 22 is placed in the seventh tube 13. One end of the seventh tube 13 is fixedly connected to the first base 11, and the other end is fixedly connected to the second base 12. A preferred structure of the seventh tube 13 fixedly connected to the two bases may be implemented by providing positioning holes and corresponding positioning protrusions formed on an end of the seventh tube 13 and corresponding base, snapping the positioning protrusions into the corresponding positioning holes, thus further increasing the precision of assembly.

Second Embodiment

Figure 3:
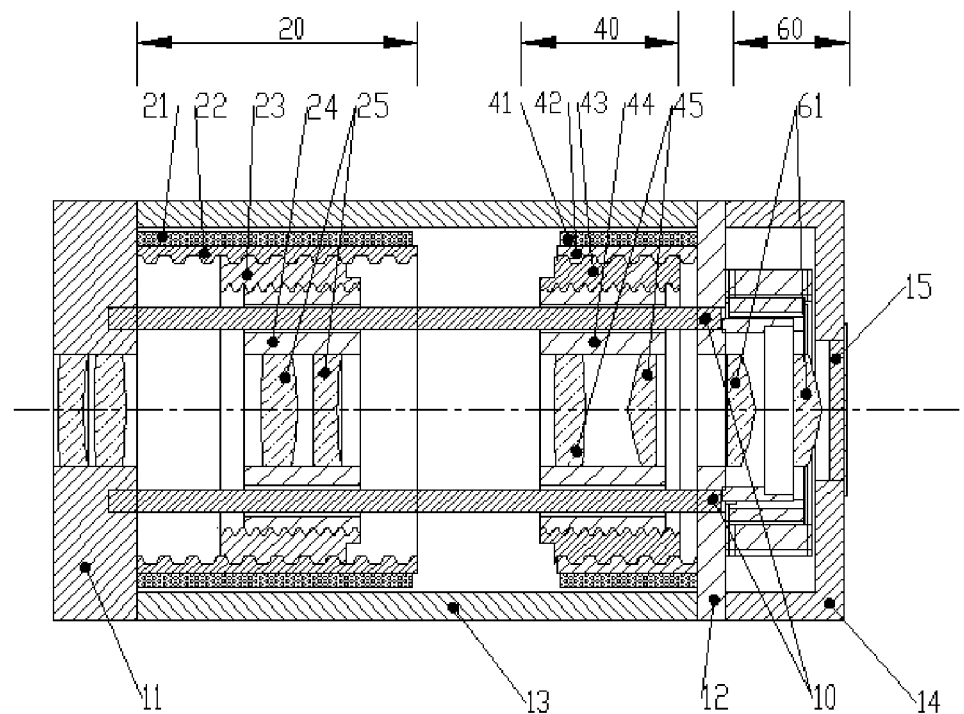
FIG. 3 is a schematic view showing a longitudinal section of the optical imaging device according to another embodiment of the present disclosure.

FIG. 3 shows a second embodiment of the zoom lens apparatus with focus adjusting according to the present disclosure. Compared with the first embodiment, in the second embodiment, an independently controlled focus structure, i.e., structure 40, is added between the structure 20 and the structure 60 so as to meet a wider application requirement.

The added structure 40 is similar to the structure 20 in that it is also a USM-driven structure. Specifically, the structure 40 comprises a fourth tube 42, a fifth tube 43, a second set of piezoelectric elements 41, and a sixth tube 44.

Similar to the structure 20, the fourth tube 42 and the fifth tube 43 as well as the second set of piezoelectric elements 41 form a screw-driven USM, wherein the fourth tube 42 is the stator of the USM, the fifth tube 43 is the rotor of the USM, and the sixth tube 44 is a lens tube whose hollow portion is used for accommodating an optical lens set 45. The fourth tube 42 is fixed relative to the first tube 22, and the rotary axis of the fifth tube 43 is same as that of the second tube 23. The structural relationship among the fourth tube 42, the fifth tube 43, the second set of piezoelectric elements 41 and the sixth tube 44 is similar to that among the first tube 22, the second tube 23, the first set of piezoelectric elements 21 and the third tube 24. It shall be noted that, though the structural relationship of the components in the structure 40 is same to that in the structure 20, the dimensions of the components and the thread curve used between the components may be different so as to meet the requirements of different controlling precision, adjusted speed and running length.

Yet one variant of the second embodiment of the optical imaging device according to the present disclosure comprises the aforesaid embodiment of the zoom lens apparatus with focus adjusting, accompanied with a first optical lens set 25 (which is USM-driven by the structure 20) for zooming, a second optical lens set 61 (which is VCM-driven by the structure 60) for focus, a third optical lens set 45 (which is USM-driven by the structure 40) for zooming compensation, and a photo sensor 15, as shown in FIG. 3. The optical axes of the three optical lens sets are identical and parallel to the rotary axis of the rotor of the USM.

Referring to FIG. 3, in other variants of the second embodiment of the zoom lens apparatus with focus adjusting, the two USM-driven structures is similar to the USM-driven structure mentioned in the First Embodiment, wherein the rod 10 is utilized to implement the lens tube radially fixed relative to the stator of the USM. The rod 10 may be shared by the structure 20 and the structure 40. In an embodiment, there are two rods 10 symmetrically disposed with respect to the rotary axis of the rotor of the USM.

Referring to FIG. 3, in other variants of the second embodiment of the zoom lens apparatus with focus adjusting, a structure may be applied to implement the lens tube radially fixed relative to the rotor of the USM. Specifically, the structure comprises a first base 11 having a hole and a second base 12 having a hole, wherein the first base 11 and the second base 12 are respectively provided with limit holes, the first tube 22 is fixed on the first base 11, the fourth tube 42 is fixed on the second base 12, and both ends of the rod 10 are respectively inserted or passed through the limit holes on the first base 11 and the second base 12.

Referring to FIG. 3, in other variants of the second embodiment of the zoom lens apparatus with focus adjusting, to ensure a better precision of assembly, a seventh tube 13 is provided. The structure 20 and the structure 40 are placed in the seventh tube 13. One end of the seventh tube 13 is fixedly connected to the first base 11, and the other end is fixedly connected to the second base 12. Such structure may be more suitable for ensuring the parallel between the rod 10 and the rotary axis of the rotor of the USM and the consistency of the optical axes of the two optical lens sets.

Third Embodiment

Figure 4:
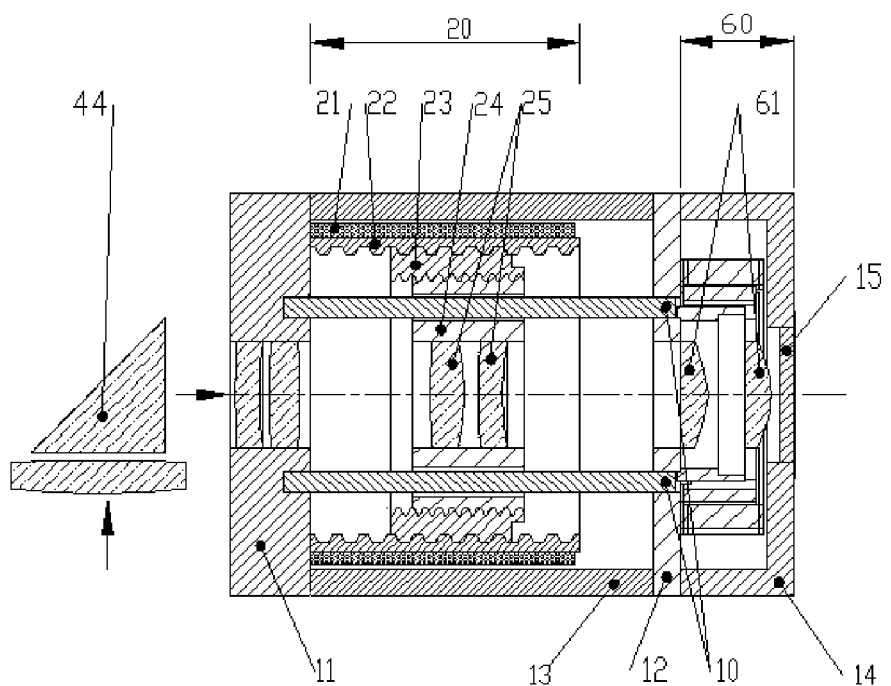
FIG. 4 is a schematic view showing a longitudinal section of the optical imaging device according to another embodiment of the present disclosure.

FIG. 4 shows a third embodiment of the zoom lens apparatus with focus adjusting and the corresponding optical imaging device according to the present disclosure. Compared with the First Embodiment, an optical path adjusting element is added in this embodiment. The optical path adjusting element is arranged on the optical path at front of the first optical lens set 25 for bending the optical path of the incident ray. For example, the incident ray is bended 90 degree by an added periscope structure 44 before entering the subsequent focus structure, thus the imaging device applied in mobile phone may be laid horizontally so as to reduce the height of the imaging device, thus meeting the thickness requirement of the devices such as mobile phones, etc.

It should be noted that, the above described embodiments serve only to help to understand the present disclosure, but not to limit the protection scope of the present disclosure. It will be apparent to those of ordinary skill in the art that various modifications and variations can be made without departing from the scope or spirits of the present disclosure.

The invention claimed is:

1. A zoom lens apparatus with focus adjusting, comprising:
a first tube with threads formed on an inner surface thereof,
a second tube with threads formed on both outer and inner surfaces thereof, wherein the second tube is placed inside the first tube, at least one of a pitch or a spiral direction of the threads on the outer surface is different from that of the threads on the inner surface, and the threads on the outer surface are arranged to match with the threads on the inner surface of first tube,
a first set of piezoelectric elements attached on the outer surface of the first tube and excited by electric signals to propel the first tube to generate a traveling wave, so as to force the second tube to rotate relative to the first tube,
a third tube placed inside the second tube, wherein threads are formed on an outer surface of the third tube for matching with the threads on the inner surface of the second tube, a hollow portion of the third tube is arranged to hold a first optical lens set, and the third tube is radially fixed relative to the first tube such that the third tube is moved in a straight line along a rotary axis of the second tube during rotation of the second tube,
a voice coil motor comprising a stationary portion and a movable portion, wherein one of the stationary portion and the movable portion comprises a magnet and the other comprises a conductor, the conductor is excited by electric signals for driving the movable portion to move in a straight line relative to the stationary portion, the stationary portion is fixed relative to the first tube such that the motion path of the movable portion is parallel to the rotary axis of the second tube, and the movable portion is arranged to attach a second optical lens set thereon,
at least one rod, wherein the rod is radially fixed relative to the first tube,
the third tube being radially fixed relative to the first tube comprising: at least one through hole formed within a wall of the third tube and parallel to the rotary axis of the second tube, therein the rod passes through the through hole such that the third tube is moved in a straight line along the rod during the rotation of the second tube.

2. The apparatus as claimed in claim 1, further comprising:
a fourth tube with threads formed on an inner surface thereof, wherein the fourth tube is fixed relative to the first tube,
a fifth tube with threads formed on both outer and inner surfaces thereof, wherein the fifth tube is placed in the fourth tube, at least one of a pitch or a spiral direction of the threads on the outer surface is different from that of the threads on the inner surface, and the threads on the outer surface are arranged to match with the threads on the inner surface of fourth tube, a second set of piezoelectric elements attached on the outer surface of the fourth tube and excited by electric signals to propel the fourth tube to generate a traveling wave, so as to force the fifth tube to rotate relative to the fourth tube, and a rotary axis of the fifth tube is identical to that of the second tube, a sixth tube placed in the fifth tube, wherein threads are formed on an outer surface of the sixth tube for matching with the threads on the inner surface of the fifth tube, the hollow portion of the sixth tube is arranged to hold a third optical lens set, and the sixth tube is radially fixed relative to the fourth tube such that the sixth tube is moved in a straight line along the rotary axis of the fifth tube during rotation of the fifth tube.

3. The apparatus as claimed in claim 2, further comprising:
the sixth tube being radially fixed relative to the fourth tube comprising: at least one through hole formed within a wall of the sixth tube and parallel to a rotary axis of the sixth tube, therein the rod passes through the through hole such that the sixth tube is moved in a straight line along the rod during rotation of the fifth tube.

4. The apparatus as claimed in claim 3, further comprising:
a first base, a second base and a seventh tube,
wherein the first base and the second base are provided with limit holes respectively,
one end of the seventh tube is fixedly connected to the first base and the other end is fixedly connected to the second base,
the first tube and the fourth tube are placed inside the seventh tube, and the first tube is fixed to the first base,
the fourth tube being fixed relative to the first tube comprising the fourth tube fixed to the second base,
the rod being radially fixed relative to the first tube having both ends of the rod respectively inserted into or passed through the limit holes on the first base and the second base.

5. The apparatus as claimed in claim 1, wherein there are two rods disposed symmetrically with respect to the rotary axis of the second tube.

6. An optical imaging device, comprising:
a first tube with threads formed on an inner surface thereof,
a second tube with threads formed on both outer and inner surfaces thereof, wherein the second tube is placed inside the first tube, at least one of a pitch or a spiral direction of the threads on the outer surface is different from that of the threads on the inner surface, and the threads on the outer surface are arranged to match with the threads on the inner surface of first tube,
a first set of piezoelectric elements attached on the outer surface of the first tube and excited by electric signals to propel the first tube to generate a traveling wave, so as to force the second tube to rotate relative to the first tube,
a third tube placed inside the second tube, wherein threads are formed on an outer surface of the third tube for matching with the threads on the inner surface of the second tube, and the third tube is radially fixed relative to the first tube such that the third tube is moved in a straight line along a rotary axis of the second tube during rotation of the second tube,
a first optical lens set placed in the third tube, wherein an optical axis of the first optical lens set is parallel to the rotary axis of the second tube,
a photo sensor having a photosensitive surface perpendicular to the optical axis,
a voice coil motor and a second optical lens set,
wherein the voice coil motor disposed along the optical path behind the first optical lens set comprises a stationary portion and a movable portion, thereof one of the stationary portion and the moveable portion comprises a magnet and the other of the stationary portion and the moveable portion comprises a conductor, therein the conductor is excited by electric signals for driving the movable portion to move in a straight line relative to the stationary portion, and the stationary portion is fixed relative to the first tube such that the motion path of the movable portion is parallel to the rotary axis of the second tube, the second optical lens set is fixed on the movable portion of the voice coil motor, the optical axis of the second optical lens set is identical to that of the first optical lens set, the first optical lens set is used for zooming, and the second optical lens set is used for focusing, the photo sensor is disposed along the optical path behind the second optical lens set, and at least one rod, wherein the rod is radially fixed relative to the first tube, the third tube being radially fixed relative to the first tube comprising: at least one through hole formed within a wall of the third tube and parallel to the rotary axis of the second tube, wherein the rod passes through the through hole such that the third tube is moved in a straight line along the rod during the rotation of the second tube.

7. The device as claimed in claim 6, further comprising:
a fourth tube with threads formed on an inner surface thereof, wherein the fourth tube is arranged along the optical path behind the first optical lens set and fixed relative to the first tube,
a fifth tube with threads formed on both outer surface and inner surfaces thereof, wherein the fifth tube is placed inside the fourth tube, at least one of a pitch or a spiral direction of the threads on the outer surface is different from that of the threads on the inner surface, and the threads on the outer surface are arranged to match with the threads on the inner surface of fourth tube,
a second set of piezoelectric elements attached on the outer surface of the fourth tube and excited by electric signal to propel the fourth tube to generate a traveling wave, so as to force the fifth tube to rotate relative to the fourth tube, wherein a rotary axis of the fifth tube is identical to that of the second tube,
a sixth tube placed inside the fifth tube, wherein threads are formed on an outer surface of the sixth tube for matching with the threads on the inner surface of the fifth tube, a hollow portion of the sixth tube is arranged to hold a third optical lens set, and the sixth tube is radially fixed relative to the fourth tube such that the sixth tube is moved in a straight line along the rotary axis of the fifth tube during the rotation of the fifth tube,
a third optical lens set for zooming compensation placed in the sixth tube, wherein an optical axis of the third optical lens set is identical to that of the first optical lens set.

8. The device as claimed in claim 7, further comprising:
a sixth tube being radially fixed relative to the fourth tube comprising: at least one through hole formed within a wall of the sixth tube and parallel to the rotary axis of the second tube, wherein the rod passes through the through hole such that the sixth tube is moved in a straight line along the rod during the rotation of the fifth tube.

9. The device as claimed in claim 8, further comprising:
a first base, a second base and a seventh tube,
wherein the first base and the second base are provided with limit holes respectively, one end of the seventh tube is fixedly connected to the first base and the other end is fixedly connected to the second base, the first tube and the fourth tube are placed in the seventh tube, and the first tube is fixed to the first base, the fourth tube being fixed relative to the first tube comprising the fourth tube fixed to the second base, the rod being radially fixed relative to the first tube having both ends of the rod respectively inserted into or passed through the limit holes on the first base and the second base.

10. The device as claimed in claim 6, further comprising an optical path adjusting element that is arranged on the optical path at the front of the first optical lens set for bending the optical path of an incident ray.

11. The device as claimed in claim 7, further comprising an optical path adjusting element that is arranged on the optical path at the front of the first optical lens set for bending the optical path of an incident ray.

12. The device as claimed in claim 8, further comprising an optical path adjusting element that is arranged on the optical path at the front of the first optical lens set for bending the optical path of an incident ray.

13. The device as claimed in claim 9, further comprising an optical path adjusting element that is arranged on the optical path at the front of the first optical lens set for bending the optical path of an incident ray.

14. The apparatus as claimed in claim 3, wherein the at least one rod comprises two rods, two rods disposed symmetrically with respect to the rotary axis of the second tube.

\* \* \* \* \*